United States Patent [19]

Rothrock

[11] 4,032,861

[45] * June 28, 1977

[54] LASER DEVICE FOR ALTERING SURFACES IN ACCORDANCE WITH GIVEN PATTERNS

[75] Inventor: Larry R. Rothrock, Poway, Calif.

[73] Assignee: Union Carbide Corporation, New York, N.Y.

[ * ] Notice: The portion of the term of this patent subsequent to Apr. 18, 1989, has been disclaimed.

[22] Filed: July 16, 1975

[21] Appl. No.: 596,262

Related U.S. Application Data

[63] Continuation of Ser. No. 416,236, Nov. 15, 1973, abandoned, which is a continuation of Ser. No. 226,548, Feb. 15, 1972, abandoned, which is a continuation of Ser. No. 51,798, July 2, 1970, abandoned.

[52] U.S. Cl. .................. 331/94.5 C; 219/121 L
[51] Int. Cl.² .................................. H01S 3/08
[58] Field of Search ........... 331/94.5; 219/121 LA, 219/121 LM

[56] References Cited

UNITED STATES PATENTS

| | | | |
|---|---|---|---|
| 3,293,565 | 12/1966 | Hardy | 331/94.5 C |
| 3,316,501 | 4/1967 | Collins et al. | 331/94.5 C |
| 3,379,998 | 4/1968 | Soules et al. | 331/94.5 C |
| 3,437,942 | 4/1969 | Maiman | 331/94.5 C |
| 3,657,510 | 4/1972 | Rothrock | 331/94.5 Q |

*Primary Examiner*—William L. Sikes
*Attorney, Agent, or Firm*—Harrie M. Humphreys

[57] ABSTRACT

A high gain optically pumped laser device includes a mask having cut-out portions defining a given pattern disposed in the resonant optical cavity defined between end mirrors at opposite ends of the laser material. Each of the end mirrors is equivalent to an optically flat reflecting surface such that only cross-sectional portions in the laser material similar to the pattern are stimulated to emit output laser radiation. This stimulated emission has a high energy density and may be directly radiated to a target surface to alter the surface in a manner corresponding to the given pattern. The alteration may take the form of actual vaporization, heating, or oxidation of portions of the surface. Thus carefully controlled engraving type processes or other processes involving a physical alteration of a surface such as the drilling of square or unusually shaped holes as determined by the pattern can be carried out.

9 Claims, 3 Drawing Figures

*INVENTOR:*
LARRY R ROTHROCK

LASER DEVICE FOR ALTERING SURFACES IN ACCORDANCE WITH GIVEN PATTERNS

This application is a continuation of application Ser. No. 416,236 filed Nov. 15, 1973, now abandoned, which is in turn a continuation of application Ser. No. 226,548 filed Feb. 15, 1972, now abandoned, which is in turn a continuation of application Ser. No. 51,798 filed July 2, 1970, now abandoned.

This invention relates to lasers and more particularly to a novel high gain optically pumped laser capable of altering surfaces of target material in accordance with given patterns.

BACKGROUND OF THE INVENTION

It is known in the art to provide light images by disposing a mask in front of output radiation from a laser. The principles involved are substantially the same as in normal light projectors used for projecting slides or motion picture film. In these devices, the entire output radiation impinges upon the mask and the transparent or cutout portions of the mask defining the patern pass a percentage of the output radiation. While optical imaging of the pattern on the mask is possible with this system, it is very difficult to provide sufficient energy density or power in the image defind by the mask to effect operations other than that of simply imaging a picture; for example, drilling through a material or effecting a welding along a given pattern as defined by the mask.

The two major difficulties in attempting to perform such drilling or welding operations in accord with a pattern in the mask arises from the fact that, first sufficient energy or power is not available in the beam after it leaves the mask because of the eclipsing which cuts down a large part of the total power available and, second, if the overall power is increased sufficiently to attempt to solve this problem, the mask itself is often subject to destruction.

In simple light imaging systems, it has been proposed to incorporate a mask in the optical cavity of a laser so that the mask itself will not be subject to destruction. Such a system has been described in U.S. Pat. No. 3,293,565 issued to W. A. Hardy for a gas laser wherein curved end mirrors are required in order to effect the lasing action together with a suitable lens to project the image from the system. With such a gas laser, there is not nearly enough output energy in the projected beam to effect physical alternation of a target surface.

BRIEF DESCRIPTION OF THE PRESENT INVENTION

The present invention contemplates a laser device in which a mask defining a desired pattern is placed in the laser cavity but wherein the output power or energy density from the laser is easily sufficient to effect physical alterations of surfaces so that drilling and welding operations or engraving type processes can readily be carried out. It is this primary feature which distinguishes the present invention from known laser imaging devices.

More particularly, the laser device utilizes a high gain optically pumped laser material, preferably a solid state cylindrical crystal. First and second end mirrors define the resonant optical cavity for the laser material, the first end mirror being an optical flat with 100 percent reflectivity or an end mirror means equivalent to such an optical flat, and the second end mirror being optically flat and partially transmissive to couple the laser radiation out of the optical cavity.

A mask having cut-out portions or equivalent transparent portions defining a given pattern is positioned in the optical cavity in such a manner that only cross-sectional portions in the laser material or rod itself similar to the pattern are stimulated to emit output laser radiation. The arrangement is as though a plurality of individual laser rods were oriented to define the pattern each rod operating at full capacity. When the generated pattern is coupled out of the system, the energy density is such as to provide the desired physical alteration of the target surface.

In a modified arrangement, the first end mirror means equivalent to an optically flat reflecting surface comprises a diverging lens cooperating with a concave reflecting mirror spaced from the diverging lens and positioned to intercept and return the laser radiation back through the diverging lens. By this arrangement, the cut-out portions or pattern on the mask may occupy an area substantially greater than the cross-sectional area of the laser material itself.

BRIEF DESCRIPTION OF THE DRAWINGS

A better understanding of the invention will be had by referring to preferred embodiments thereof as illustrated in the accompanying drawings, in which.

DETAILED DESCRIPTION OF THE INVENTION

Figure 1:
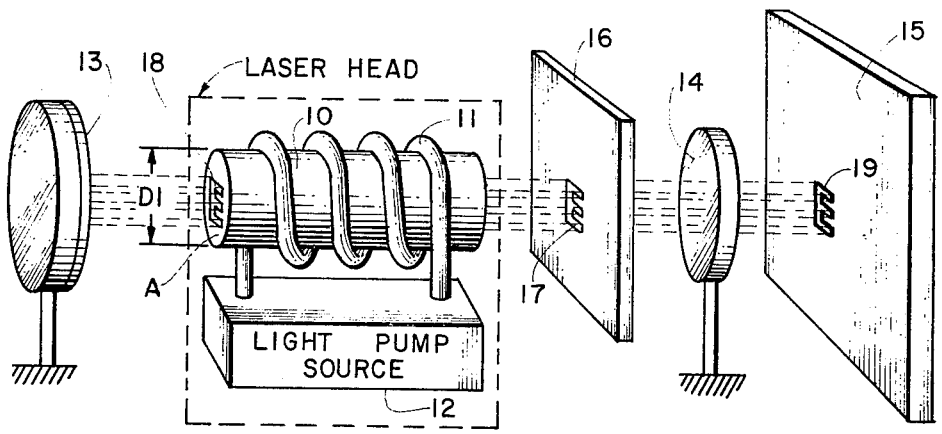
FIG. 1 is a schematic type perspective of a laser device according to the invention.

Referring first to FIG. 1 there is shown a laser material preferably in the form of a crystal rod 10 pumped by any suitable means such as a helical lamp 11 connected to a light pump source 12. Suitable first and second end mirror means 13 and 14 define a resonant optical cavity for the laser material.

In the embodiment of FIG. 1, the first end mirror means constitutes an optically flat mirror providing substantially 100 percent reflectivity for laser radiation while the second end mirror means comprises an optically flat mirror which is partially transmissive to couple the laser radiation out of the optical cavity. A target surface 15 is shown disposed to intercept output laser radiation from the laser system.

In accord with the invention, there is provided a mask 16 having cut-out portions defining a given pattern 17 disposed in the optical cavity. In the particular illustration, the cut-out pattern takes the form of the letter E and this pattern falls within an area no greater than the cross-sectional area A of the laser material 10.

With the foregoing arrangement, and assuming that the laser material is light pumped to effect stimulated emission of radiation, such stimulated emission can only occur at cross-sectional portions of the laser material corresponding to the pattern 17. Thus, there is; indicated by the shaded end of the crystal rod 10 as at 18 those cross-sectional portions of the laser material which are actually caused to lase. There thus results a system which would be equivalent to a series of small laser rods in side by side relationship aligned to define the letter E, each rod operating at full capacity.

The resulting laser output beam will have a cross-section corresponding to the pattern 17 and when it strikes the target surface 15, it will actually alter the surface as indicated at 19 in a manner corresponding to the pattern. This alternation may take the form of vaporization, heating, or oxidation and by utilizing an extremely high gain laser material, sufficient energy is available to actually drill an opening following the outlines of the pattern.

It should be understood that while the entire laser crystal material 10 is light pumped, only those cross-sectional portions corresponding to the pattern as shown at 18 will actually lase and since the mask is transparent to those portions there is no possibility of deterioration of other portions of the mask when disposed as shown. Further, some of the light energy pumped into portions of the crystal outside the lasing cross-sectional portions will be utilized in effecting the inverted population levels in those portions which are caused to lase thereby resulting in a very high energy density in those portions of the output beam defining the pattern.

Figure 2:
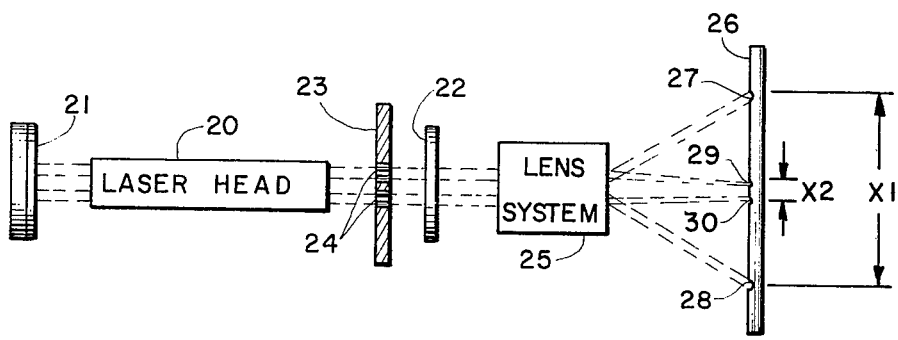
FIG. 2 is a schematic elevational view partly in cross-section illustrating the manner in which a lens system may be employed with the structure of FIG. 1; and, FIG. 3 is a schematic view of a modified laser device according to the invention enabling the use of larger mask structures as compared to that of the device in FIG. 1.

FIG. 2 illustrates a system similar to that of FIG. 1 wherein there is provided a laser head 20, first and second end mirrors 21 and 22 with a mask 23 having a cut-out pattern 24 disposed in a defined optical cavity. The laser head 20 may contain the same elements 10 and 11 as described in FIG. 1 and the end mirrors 21 and 22 and mask and pattern 24 may correspond to the members 13, 14, 16, and 17 of FIG. 1.

In the embodiment of FIG. 2, there is shown an exterior lens system 25 positioned to intercept the output laser beam of cross-section corresponding to the pattern 24. This lens may be adjusted to enlarge or magnify the final pattern when it strikes the target surface on 26 or, alternatively, may focus down the pattern to a very small geometry for impingement on the target 26. The numerals 27 and 28 indicate corresponding portions of the pattern on the mask when the lens system magnifies while the numerals 29 and 30 indicate the corresponding points when the lens system has reduced the size of the cross-sectional area. The power density of the cross-sectional portion of the beam decreases, of course, under magnification. On the other hand, the magnification may be limited such the desired physical altering of the surface of the target can still be effected. When the cross-sectional area is reduced down by the lens system, the power density will increase and such will permit a decrease in the initial power supply to the laser system to effect a desired physical alteration of the surface 26 on a minute scale. The variation of points on the pattern which can be effected by the lens system is indicated by the letters X1 and X2 in FIG. 2.

In some instances, it may be impractical to provide a mask with a pattern wherein the pattern is confined within an area on the mask no greater than the cross-sectional area of the laser material. In this event, a modified system such as illustrated in FIG. 3 may be used.

Figure 3:
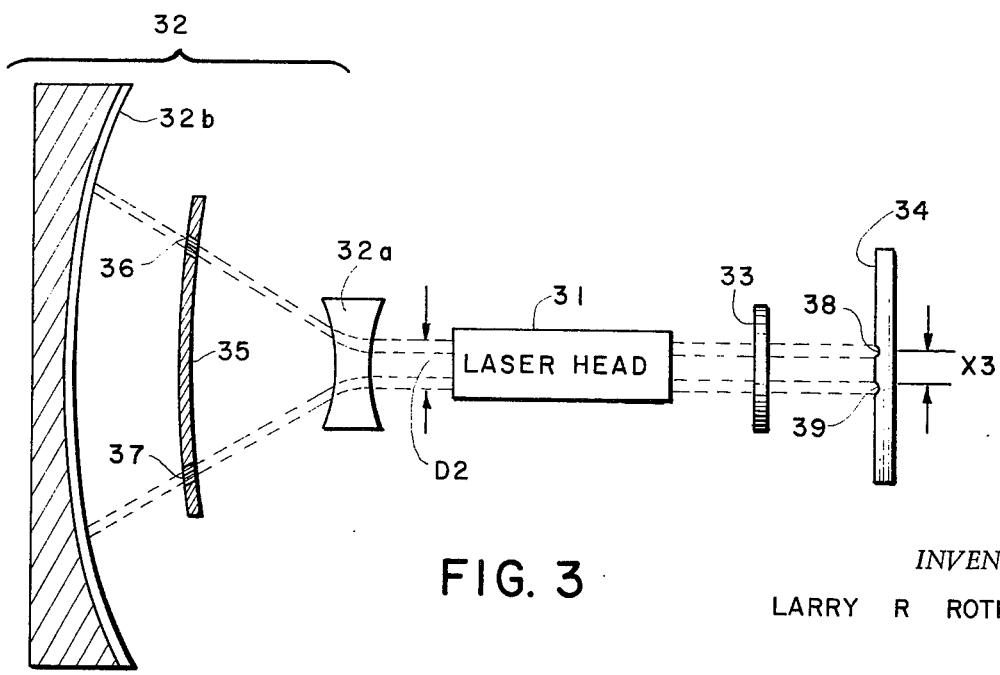

With specific reference to FIG. 3, there is shown a laser head 31, first end mirror means 32 comprising a diverging lens 32a and a concave reflector 32b, a second end mirror 33 and exterior target surface 34. The components in the laser head 31, second end mirror 33, and target surface 34 may be the same as the corresponding elements described in FIG. 1. The first end mirror means 32, however, while functioning equivalently to an optically flat end mirror such as the mirror 13 of FIG. 1 enables the use of a larger mask pattern than is possible in FIGS. 1 or 2. Such a larger mask is shown at 35 with cut-out portions 36 and 37 constituting part of a pattern. The area of the laser material in the laser head 31 is determined by the diameter of the rod indicated at D2. This diameter may correspond to the diameter D1 of the laser rod of FIG. 1. It is important to note that the cross-sectional area of the laser light leaving one end of the laser rod in the head 31 at the point it passes the diameter arrows D2 is precisely the same as the cross-sectional area of the returning radiation after total reflection from the first end mirror means 32. The first end mirror means 32 comprised of the diverging lens 32a and concave reflector 32b is thus equivalent to an optically flat end mirror as described heretofore.

Altered surface portions on the target surface 34 are indicated at 38 and 39 in FIG. 3 and this altered surface is provided in the same manner as by the systems of FIGS. 1 and 2 except that the arrangement of FIG. 3 permits a larger mask pattern to be utilized.

The above discussion and FIG. 1 shows that when the first end mirror means comprises an optically flat mirror and the overall outer dimensions of the pattern defined by the cut-out portions of the mask are such that the pattern falls within an area no greater than the cross-sectional area of the laser material, then the cross-sectional portions of the laser material that are stimulated to emit output laser radiation are congruent with the cut-out portions of the mask defining the pattern. In the embodiment of FIG. 3, the mask has a larger cross-sectional area than the laser material. However, the cross-sectional area of the radiation returning from the mask and lens system to the end of the laser material is of the same cross-sectional area as when it left that end of the laser material, and therefore, the cross-sectional portions of the laser material which are stimulated to emit laser output radiation are congruent with the shape of the radiation which leaves and subsequently returns to the end face. Thus, in both the embodiments of FIG. 1 and FIG. 3, the cross-sectional portions of the laser material which are stimulated to emit laser output radiation are congruent throughout the entire length of the laser material.

OPERATION

The operation of the laser device of this invention will be apparent from the foregoing description. Should it be desired to engrave, weld, or even drill in the surface of the target in accordance with a given pattern, such pattern is formed on the mask such as the mask 16 of FIG. 1 such that only corresponding cross-sectional portions of the laser rod 10 will lase. Impingement of the output beam on the target will thus result in vaporization, heating, or oxidation of the surface depending upon the particular operation desired as shown at 19 in FIG. 1.

If it is desired that the altered surface of the target follow a similar pattern but which similar pattern is smaller or larger, the lens system described in FIG. 2 may be utilized.

Finally, if it is not feasible to provide a pattern which can be encompassed within an area on the mask corresponding to the cross-sectional area of the laser material, the modified structure of FIG. 3 may be utilized.

In all cases, a very high energy output beam is provided for effecting the desired alteration of the target surface as opposed to mere optical imaging.

As described and shown in the foregoing, discussion and drawings, the present invention includes a process for altering the surface of a material to define a given pattern which comprises the steps of: positioning in the resonant optical cavity of a laser containing a high gain optically pumped laser material and having a substantially 100% reflective first and mirror means and a partially transmissive second end mirror means, a mask having cut-out portions defining the given pattern so that only cross-sectional portions in the laser material similar to the pattern are stimulated to emit output laser radiation; producing, in the optical cavity, laser radiation having the same cross-sectional area upon leaving, being reflected by the first end mirror means, and returning to the end of the laser material; coupling laser output radiation out of the cavity through the second end mirror means; and impinging the output laser radiation on the surface of the material to thereby effect physical alteration of the surface to the given pattern.

The process can also include, in accordance with the discussion hereinabove relating to FIG. 2, the additional steps of: positioning a lens system between the laser and the surface to be altered for changing the size of the cross-sectional of the output laser radiation; and passing the output laser radiation through the lens system prior to impingement of the surface to effect a smaller or larger similar pattern of altered surface portions on the surface.

While the mask structures have been described as having cut-out portions defining the pattern, it will be evident that equivalent patterns can be formed by providing portions that are simply transmissive to the particular wave length involved. The term "cut-out portions" is meant to include any equivalent means of defining patterns on the mask for realizing the desired ends.

What is claimed is:

1. A laser device for altering the surface of a target material disposed at a fixed position exterior to said laser device to define a given pattern on said surface comprising, in combination:
   a. a high gain laser material and means for optically pumping said laser material;
   b. first and second end mirror means defining a resonant optical cavity for laser radiation from said laser material, said first end mirror means being optically flat or the equivalent of optically flat and substantially 100% reflective for laser radiation without changing the cross-sectional area of said radiation at the point it leaves one end of said laser material and returns to said one end, said second end mirror means being optically flat and partially transmissive to couple the laser radiation out of said optical cavity; and
   c. a mask having cut-out portions defining a given pattern, said mask being positioned in said optical cavity such that only cross-sectional portions in said laser material which are congruent with each other and similar to said given pattern are stimulated to emit output laser radiation, whereby said exterior target surface may be radiated by said output laser radiation to thereby effect physical alteration of said surface similar to said given pattern.

2. A device according to claim 1, including an exterior lens system between said second end mirror means and said target surface for changing the size of the cross-section of said output laser radiation defining said given pattern whereby a similar pattern of altered surface portions larger or smaller than the cut-out portions of said mask can be formed on said exterior target surface.

3. A device according to claim 1, in which said first end mirror means comprises an optically flat mirror, the overall outer dimensions of the pattern defined by the cut-out portions of said mask being such that said pattern falls within an area no greater than the cross-sectional area of said laser material, the cross-sectional portions in said laser material that are stimulated being congruent with the cut-out portions on said mask defining said pattern.

4. A device according to claim 1, in which said first end mirror means includes a diverging lens for expanding said laser radiation after it leaves said one end of said laser material and passes said point; and a concave reflecting mirror spaced from said diverging lens and positioned to intercept and return the laser radiation back through said expanding lens so that when the radiation passes said point to return to said one end, it is of the same cross-sectional area as when it left, said mark being positioned between said diverging lens and said concave mirror, whereby the cut-out portions on said mask defining said pattern may occupy an area substantially greater than the cross-sectional area of said laser material.

5. A device according to claim 1, in which said laser material comprises solid state crystal in the shape of a solid cylindrical rod.

6. A process for altering the surface of a material to define a given pattern comprising:
   positioning in the resonant optical cavity of a laser containing a high gain laser material and having a substantially 100 percent reflective and optically flat or the equivalent of optically flat first end mirror means and partially transmissive optically flat second end mirror means, a mask having cut-out portions defining said given pattern;
   optically pumping said laser material to stimulate emission of laser radiation only in cross-sectional portions in said laser material which are congruent with each other and similar to said given pattern to produce in said optical cavity laser radiation having the same cross-sectional area upon leaving, being reflected by said first end mirror means, and returning to the end of said laser material;
   coupling said laser radiation out of said cavity through said second end mirror means; and
   impinging said output laser radiation on the surface of said material to thereby effect physical alteration of said surface to said given pattern without moving said laser or said material 7. Process in accordance with claim 6 which additionally comprises:
   positioning a lens system between said laser and said surface for changing the size of the cross-section of said output laser radiation; and
   passing said output laser radiation through said lens system prior to impingement on said surface to effect a smaller or larger similar pattern of altered surface portions on said surface.

8. A laser device for altering the surface of a target material disposed exterior to said laser device to define a given pattern on said surface comprising, in combination:
  a. a high gain laser material and means for optically pumping said laser material;
  b. first and second end mirror means defining a resonant optical cavity for laser radiation from said laser material, said first end mirror means being optically flat or the equivalent of optically flat and substantially 100 percent reflective for laser radiation without changing the cross-sectional area of said radiation at the point it leaves one end of said laser material and returns to said one end, said second end mirror means being optically flat and partially transmissive to couple the laser radiation out of said optical cavity; and
  c. a mask having cut-out portions defining a given pattern, said mask positioned in said optical cavity such that only cross-sectional portions in said laser material which are congruent with each other and similar to said given pattern are stimulated to emit output laser radiation, whereby said exterior target surface may be radiated by said output laser radiation to thereby effect physical alteration of said surface similar to said given pattern.

9. A process for altering the surface of a material to define a given pattern comprising:
  positioning, in the resonant optical-cavity of a laser containing a high gain laser material and having a substantially 100 percent reflective and optically flat or the equivalent of optically flat first end mirror means and partially transmissive optically flat second end mirror means, a mask having cut-out portions defining said given pattern;
  optically pumping said laser material to stimulate emission of laser radiation only in cross-sectional portions in said laser material which are congruent with each other and similar to said given pattern to produce in said optical cavity laser radiation having the same cross-sectional area upon leaving, being reflected by said first end mirror means, and returning to the end of said laser material;
  coupling said laser radiation out of said cavity through said second end mirror means; and
  impinging said output laser radiation on the surface of said material to thereby effect physical alteration of said surface to said given pattern.

* * * * *